United States Patent
Lv et al.

(10) Patent No.: US 10,129,745 B2
(45) Date of Patent: Nov. 13, 2018

(54) AUTHENTICATION METHOD AND SYSTEM FOR WIRELESS MESH NETWORK

(71) Applicant: ZTE Corporation, Shenzhen (CN)

(72) Inventors: Junwei Lv, Shenzhen (CN); Hua Rui, Shenzhen (CN); He Huang, Shenzhen (CN)

(73) Assignee: SHANGHAI ZHONGXING SOFTWARE COMPANY LIMITED, Shanghai (CN)

( * ) Notice: Subject to any disclaimer, the term of this patent is extended or adjusted under 35 U.S.C. 154(b) by 0 days.

(21) Appl. No.: 14/428,673

(22) PCT Filed: Aug. 21, 2013

(86) PCT No.: PCT/CN2013/081959
§ 371 (c)(1),
(2) Date: Mar. 17, 2015

(87) PCT Pub. No.: WO2014/040481
PCT Pub. Date: Mar. 20, 2014

(65) Prior Publication Data
US 2015/0249921 A1    Sep. 3, 2015

(30) Foreign Application Priority Data

Sep. 17, 2012 (CN) .......................... 2012 1 0345579

(51) Int. Cl.
*H04W 12/06* (2009.01)
*H04L 29/08* (2006.01)
(Continued)

(52) U.S. Cl.
CPC ......... *H04W 12/06* (2013.01); *H04L 63/0884* (2013.01); *H04L 67/104* (2013.01);
(Continued)

(58) Field of Classification Search
CPC ............... H04L 63/0884; H04L 67/104; H04L 63/0892; H04L 63/168
See application file for complete search history.

(56) References Cited

U.S. PATENT DOCUMENTS

| | | | | |
|---|---|---|---|---|
| 2007/0206537 | A1* | 9/2007 | Cam-Winget | ........ H04L 63/162 370/331 |
| 2007/0250713 | A1* | 10/2007 | Rahman | ................ H04L 63/162 713/171 |
| 2008/0304485 | A1* | 12/2008 | Sinha | ..................... H04L 12/66 370/392 |

FOREIGN PATENT DOCUMENTS

| | | |
|---|---|---|
| CN | 101621852 B | * 8/2008 |
| CN | 101621434 A | 1/2010 |

(Continued)

OTHER PUBLICATIONS

Calhoun, Light Weight Access Point Protocol, Mar. 2007, Internet Engineering Task Force (IETF).*

(Continued)

*Primary Examiner* — Carl G Colin
*Assistant Examiner* — Vance M Little
(74) *Attorney, Agent, or Firm* — Cantor Colburn LLP

(57) ABSTRACT

The disclosure discloses an authentication method and system for a wireless mesh network. The method comprises: when a new node accesses a network and the node is a Mesh Point (MP), the MP selects one authenticated node from neighbor nodes as a father node, and a uniquely identified secure path exists between the father node and an AC; the MP uses the father node as an authentication point to perform authentication; and after being transmitted to the AC through the secure path between the father node and the AC, which then forwards an authentication message to an AS; similarly, a return message of the AS is forwarded by the AC to the father node through the secure path, and the MP (Continued)

is authenticated. The authentication message is saved on the AC at the same time, so as to facilitate the second authentication of the MP.

18 Claims, 9 Drawing Sheets

(51) Int. Cl.
  *H04L 29/06* (2006.01)
  *H04W 76/14* (2018.01)
  *H04W 84/18* (2009.01)
(52) U.S. Cl.
  CPC ......... *H04W 76/14* (2018.02); *H04L 63/0892* (2013.01); *H04L 63/168* (2013.01); *H04W 84/18* (2013.01)

(56) References Cited

FOREIGN PATENT DOCUMENTS

| CN | 101621852 A | 1/2010 |
|---|---|---|
| CN | 102209319 A | 10/2011 |
| DE | 102006038591 A1 | 2/2008 |
| WO | 03096554 A2 | 11/2003 |

OTHER PUBLICATIONS

Calhoun, Control and Provisioning of Wireless Access Points (CAPWAP) Protocol Specifications, 2009, Internet Engineering Task Force (IETF).*

International Search Report for corresponding application PCT/CN2013/081959 filed Aug. 21, 2013; dated Nov. 28, 2013.

Supplementary European Search Report for corresponding application EP13837754 filed Aug. 21, 2013; dated Sep. 7, 2015.

Lee Y. et al. "Hybrid Authentication and Key Distribution Scheme for Wireless Mobile Multi-Hop Networks", IEICE Transactions on Communicaitons, Coomunication Society, Tokyo, JP. vol. E92B, No. 2. Feb. 1, 2009, pp. 616-619.

IEEE Standard for Information 1-15 Technology—Telecommunications and information exchange between systems—Local and metropolitan area networks—Specific requirements Part 11: Wireless LAN Medium Access Control (MAC) and Physical Layer (PHY) specifications Amendment 10: Mesh Networking; Networking;IEEE Std 802.IIs-11, IEEE Standard, IEEE, Piscataway, NJ, USA, Sep. 10, 2011 (Sep. 10, 2011), pp. 1-372, XP068050188, ISBN: 978-0-7381-6731-2.

* cited by examiner

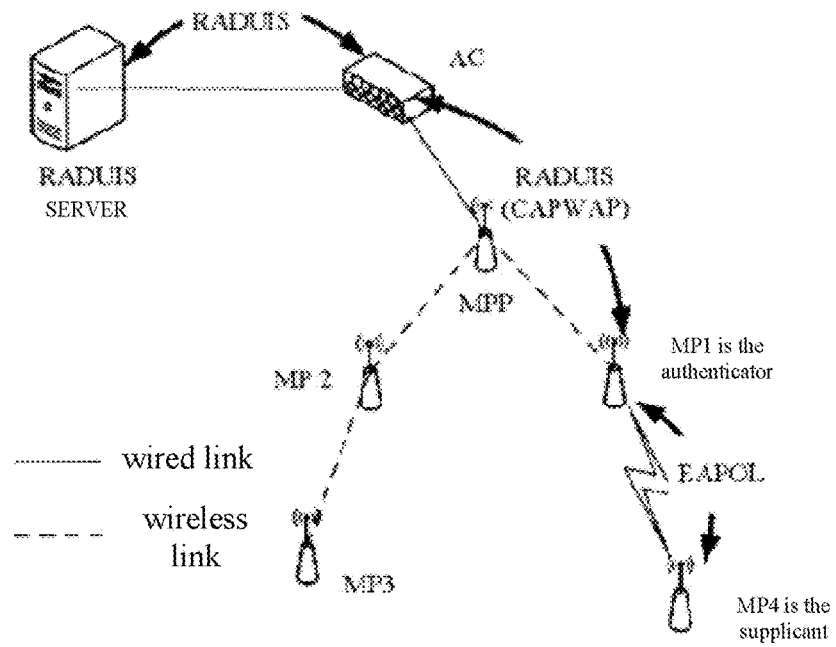

Fig. 1

When a new node accesses a network and the type of the node is an MP node type, the MP node selects one node which has been authenticated as a father node from neighbor nodes, and establishes a peer-to-peer link with the father node, wherein a uniquely identified secure path exists between the father node and an AC to identify the validity of the father node — S201

The father node receives an authentication request message initiated by the MP node, transmits the authentication request message to the AC through a secure path between the father node and the AC, forwards, by the AC, the authentication request message to an AS and receives an authentication response message fed back by the AS — S202

The father node transmits authentication state and key information carried in the authentication response message to the AC, and maintains, by the AC, authentication information of a valid node that has been authenticated — S203

Fig. 2

AUTHENTICATION METHOD AND SYSTEM FOR WIRELESS MESH NETWORK

TECHNICAL FIELD

The disclosure relates to the communication field, and in particular to an authentication method and system for a wireless mesh network.

BACKGROUND

The wireless mesh network expands the coverage area of the wireless local area network in a wireless multi-hop way. In particular, the wireless mesh network implemented based on IEEE802.11 has attracted a great deal of attention.

A method for authenticating a mesh node in the related art is described as follows. A secure path to an authentication server is stored within the mesh node. A new node selects an adjacent node as a first node, and transmits an initial authentication request message to the first node. The first node transmits the initial authentication request message to the authentication server through the secure path. The authentication server performs initial authentication on the new node and transmits an authentication message to the new node. The new node transmits a hop-by-hop authentication request message to the first node. The first node transmits the authentication message to the new node which performs hop-by-hop authentication based on the authentication message received from the first node and the authentication message received from the authentication server. The first node transmits the hop-by-hop authentication request message to the new node which transmits the authentication message to the first node. The first node performs hop-by-hop authentication based on the authentication message received from the new node and the authentication message received from the authentication server.

However, the main drawbacks of the above authentication method lie in that three authentication handshakes are required for the authentication between the new node and the first node, and such complicated authentication will increase the access time delay of the mesh node.

SUMMARY

The embodiments of the disclosure provide an authentication method and system for a wireless mesh network, so as to solve the problem that the access time delay is increased because the adopted authentication manner in the related art is relatively complicated.

In order to solve the above technical problem, the embodiments of the disclosure adopt the following technical solution.

An authentication method for a wireless mesh network according to an embodiment of the disclosure includes:

when a new node accesses a network and the new node is a Mesh Point (MP), the MP selecting one authenticated node from neighbor nodes as a father node, and establishing a peer-to-peer link with the father node, wherein a uniquely identified secure path exists between the father node and an Access Controller (AC) to identify validity of the father node;

the father node receiving an authentication request message initiated by the MP, transmitting the authentication request message to the AC through the secure path between the father node and the AC, which then forwards the authentication request message to an Authentication Server (AS), and receiving an authentication response message fed back by the AS; and the father node transmitting an authentication state and key information carried in the authentication response message to the AC, which then maintains authentication information of a valid node that has been authenticated.

In an example embodiment, in the method of the disclosure, after receiving the authentication response message fed back by the AS, the method further includes: the father node parsing the authentication response message, transmitting the parsed message to the MP, and judging whether the MP is authenticated successfully according to the parsed message, when the MP is authenticated successfully, extracting the key information carried in the parsed message, negotiating a temporary key with the MP and opening a controlled port of the MP.

In an example embodiment, an authentication system for a wireless mesh network according to an embodiment of the disclosure includes: a network access node, a father node, an Access Controller (AC) and an Authentication Server (AS), when the network access node is a Mesh Point (MP), the network access node includes:

a father node selection component, configured to select one authenticated node from neighbor nodes as a father node, and establish a peer-to-peer link with the father node, wherein a uniquely identified secure path exists between the selected father node and the AC to identify the validity of the father node;

an authentication request issuing component, configured to initiate an authentication request message to the father node;

the father node includes:

a request message processing component, configured to receive the authentication request message initiated by the network access node, transmit the authentication request message to the AC through a secure path between the father node and the AC, which then forwards the authentication request message to an AS; and a message parsing component, configured to receive and parse an authentication response message fed back by the AS through the AC, and transmit authentication state and key information carried in the authentication response message to the AC;

the AC includes:

a message forwarding component, configured to receive the authentication request message from the father node through the secure path, and forward the message to the AS, and receive the authentication response message fed back by the AS and transmit the authentication response message to the father node through the secure path; and an authentication information management component, configured to receive the authentication state and key information of the network access node reported by the father node, and maintain the authentication information of a valid node that has been authenticated;

the AS includes:

an authentication request receiving component, configured to receive the authentication request message from the AC; and an authentication feedback component, configured to, after authenticating the network access node, feed back the authentication response message to the AC.

In an example embodiment, in the system of the disclosure, the message parsing component is also configured to transmit the parsed message to the MP, judge whether the MP is authenticated successfully according to the parsed message, when the MP is authenticated successfully, extract the key information carried in the message, negotiate a temporary key with the MP and open a controlled port of the MP.

The beneficial effects of the disclosure are as follows:

when the node is authenticated by the method and the system provided in the disclosure, the message in the whole authentication flow needs to be forwarded through the AC, the AC may check the validity of the identity of the authenticator, and the MP may share the authentication information through the AC to simplify the authentication flow, thereby improving the authentication efficiency. In addition, the AC may manage all the mesh nodes in the wireless mesh network by the method and the system of the disclosure, thereby achieving the effect of centralized management and control.

BRIEF DESCRIPTION OF THE DRAWINGS

In order to describe the technical solutions in the embodiments of the disclosure or in the related art more clearly, the accompanying drawings required for description of the embodiments or the related art will be briefly introduced below. Obviously, the accompanying drawings described below are merely some embodiments of the disclosure, and for those skilled in the art, other accompanying drawings may still be acquired from these accompanying drawings without creative efforts.

FIG. 1 is a structural diagram of a wireless mesh network according to an embodiment of the disclosure;

FIG. 2 is a flowchart of an authentication method for a wireless mesh network according to an embodiment of the disclosure;

DETAILED DESCRIPTION OF EMBODIMENTS

Figure 3:
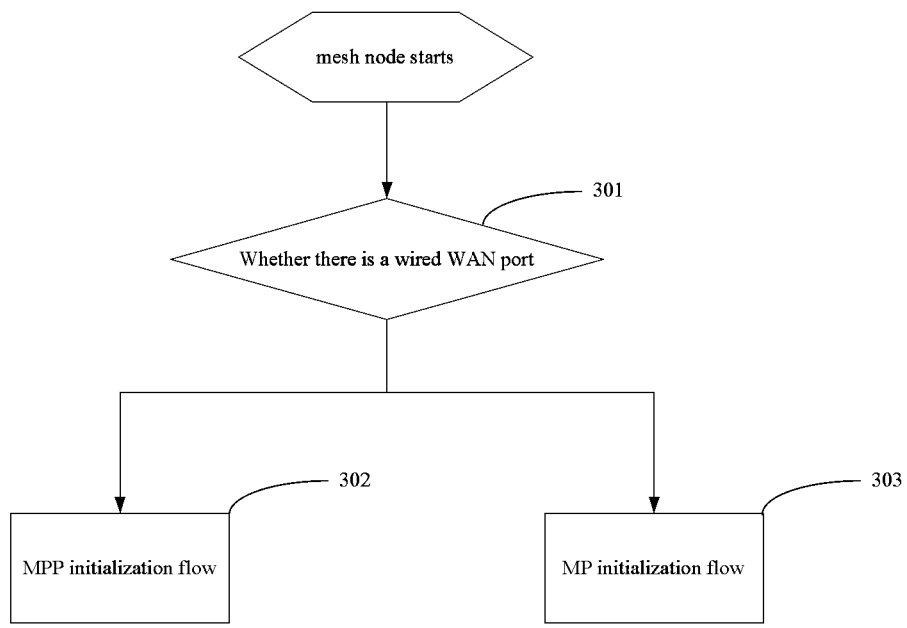
FIG. 3 is a flowchart of initialization of a mesh node in a wireless mesh network according to an embodiment of the disclosure.

The technical solutions in the embodiments of the disclosure will be described hereinafter clearly and completely with reference to the drawings and in conjunction with the embodiment. Apparently, the described embodiments are merely a part rather than all of the embodiments of the disclosure. All other embodiments obtained by those skilled in the art based on the embodiments of the disclosure without creative efforts shall fall within the scope of protection of the disclosure.

In order to solve the problem in the related art that the access time delay is increased because the adopted authentication manner is relatively complicated, the embodiments of the disclosure provide an authentication method and system for a wireless mesh network. The message in the whole authentication flow of the disclosure needs to be forwarded through an AC, the AC may check the validity of the identity of an authenticator, and the MP may share the authentication message through the AC and simplifies the authentication flow.

Method Embodiment

The embodiment of the disclosure provides an authentication method for a wireless mesh network, which is used in a system including an Authentication Server (AS), an Access Controller (AC), a Mesh Portal Point (MPP) and a Mesh Point (MP). As shown in FIG. 1, the MPP is a gateway node by which the wireless mesh network is connected to other network, and the MP may communicate with an external network through the MPP in a multi-hop wireless link. The MPP and the MP communicate with each other through a single hope or multi-hop wireless link to form a wireless mesh network. The AC is an access controller of a wireless mesh network, and securely communicates with each valid mesh node (the MPP and the MP), for example, a Control and Provisioning of Wireless Access Points Protocol (CAPWAP) tunnel may manage the MPP and the MP; the AS may verify the identity of the MP, the authentication message between the mesh node (the MPP and the MP) and the AS needs to be forwarded through the AC, and the mesh node and the AS communicate with each other through a 3A protocol (RADIUS protocol).

Specifically, as shown in FIG. 2, the authentication method for the wireless mesh network according to the embodiment of the disclosure includes:

Step 201: When a new node accesses a network and the node is an MP, the MP selects one authenticated node from neighbor nodes as a father node, and establishes a peer-to-peer link with the father node, wherein a uniquely identified secure path exists between the father node and an AC to identify validity of the father node.

Further, in the step, that the MP selects one authenticated node from neighbor nodes as the father node includes:

the MP scans a channel within a backhaul frequency band, and monitors for a beacon;

the MP selects an Mesh Basic Service Set (MBSS) matched with a capability of the MP to access according to MBSS node capability information carried in the beacon; and the MP selects one or more nodes that have been authenticated and have established a secure path with the AC as a father node candidate set, by using an MPP as a root node, and selects a next hop node of a path which arrives at the MPP at a lowest cost from the father node candidate set according to a set path selection policy.

Step 202: The father node receives an authentication request message initiated by the MP, transmits the authentication request message to the AC through a secure path between the father node and the AC. which then forwards the authentication request message to an AS and receives an authentication response message fed back by the AS.

Step 203: The father node transmits authentication state and key information carried in the authentication response message to the AC, which then maintains authentication information of a valid node that has been authenticated.

Further, in Step 203, after the father node receives the authentication response message, the method further includes:

parses the authentication response message, transmits the parsed message to the MP, and judges whether the MP is authenticated successfully according to the parsed message, when the MP is authenticated successfully, extracts the key information carried in the parsed message, negotiates a temporary key with the MP and opens a controlled port of the MP.

Further, in the method of the embodiment, when the new node accesses the network and the node is an MPP; the MPP obtains the IP addresses of itself and the AC, the MPP connects the AC, obtains the update version information and the configuration parameter information from the AC, and establishes the secure path where the unique identifier exists with the AC.

The above is the node authentication process of the embodiment of the disclosure, after successful node authentication, the operation of connecting the AC is also performed, the update version information and the configuration parameter information are obtained from the AC so that the node enters a working state. The implementation approach of the process includes:

the MP establishes a two-way communication path with the MPP;

the MP obtains an IP address of the MPP and IP address information of the AC; and the MP connects the AC, and obtains update version information and configuration parameter information from the AC, and establishes a uniquely identified secure path where a unique identifier exists with the AC.

The MP connecting the AC includes:

Step 1: the MP discovers the AC and establishes a Datagram Transport Layer Security (DTLS) protocol session with the AC;

Step 2: the MP transmits a join request message in which mesh node information is carried to the AC;

Step 3: the AC checks whether authentication information of the MP exists, if the authentication information does not exist, Step 4 is executed; otherwise, Step 5 is executed;

Step 4: the AC requests authentication information of the MP to the father node of the MP, and after receiving the authentication information of the MP from the father node, Step 5 is executed; and Step 5: the AC judges whether the MP is allowed to access according the authentication state and MP capability information in the authentication information, and if the MP is not allowed, a failure response message is returned; otherwise, the MP is allowed to access.

Example Solutions:

In Step 2, the method further includes: when the MP transmits the join request message to the AC, the MP encrypts the MP information by using the key information obtained from an authentication process to produce an inquiry text; and In Step 5, the method further includes: the AC decrypts the inquiry text according to the key information in the authentication information, if the inquiry text is decrypted correctly, it is judged whether the MP is allowed to access according to the authentication state and the MP capability information in the authentication information; if the inquiry text is decrypted incorrectly, the failure response message is returned.

Further, the method of the embodiment of the disclosure further includes:

after obtaining the configuration information, the MP judges whether information of a currently accessed mesh network matches obtained configuration information, if the information of the mesh network does not match the obtained configuration information, looks for a matched mesh network to access according to the obtained configuration information, and re-selects a father node and re-authenticates the father node.

Further, in the method of the embodiment of the disclosure, the two MPs which are authenticated successfully may directly establish a secure peer-to-peer link through the information provided by the AC, and the implementation approach thereof includes:

in the wireless mesh network, if a mesh point MP1 and a mesh point MP2 discover that both have been authenticated through beacon information, the MP1 and the MP2 establish the peer-to-peer link, and negotiate an authentication role to determine a supplicant and an authenticator; and the authenticator requests the authentication information of the supplicant to the AC through the secure path, and after receiving a response message from the AC, judges whether the supplicant is a valid site, if the supplicant is the valid site, performs temporary key negotiation with the supplicant according to key information carried in the response message to establish a secure peer-to-peer link; otherwise, removes the peer-to-peer link established with the supplicant.

When receiving the request message transmitted from the authenticator through the secure path, the AC judges whether the supplicant is the node that has been authenticated, if the supplicant is not the node that has been authenticated, replies the failure response message in which a reason for failure is carried; if the supplicant is the node that has been authenticated, judges whether management domains of the authenticator and the supplicant are allowed to communicate with each other, if the management domains are allowed to communicate with each other, replies a successful response message in which the key information is carried; if the management domains are not allowed to communicate with each other, replies the failure response message in which the reason for failure is carried.

In order to explain the implementation process of the disclosure more clearly, the specific implementation process of the method of the disclosure will be described in detail by one specific example.

Figure 4:
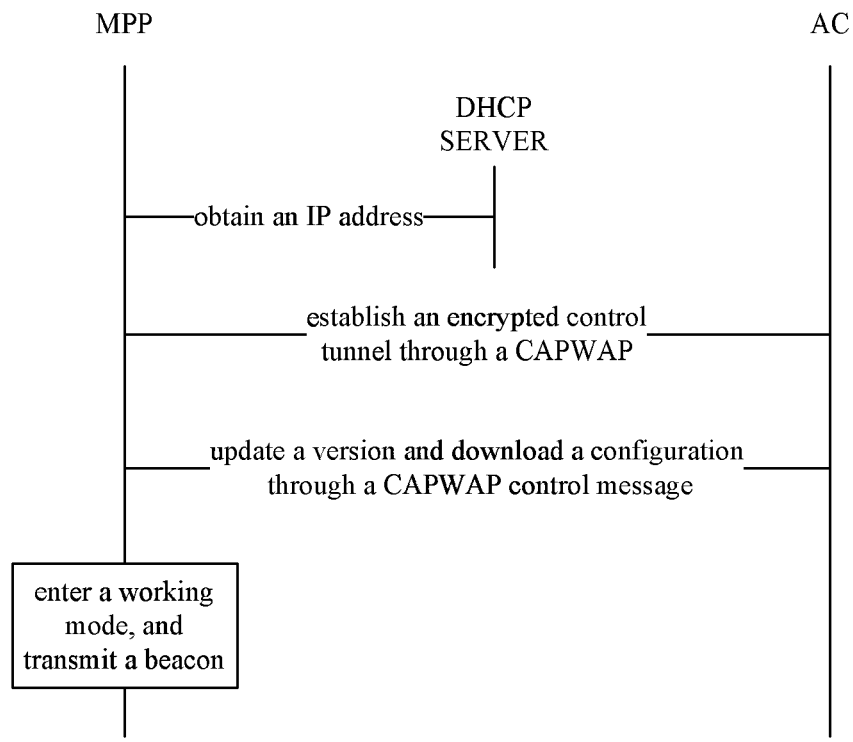
FIG. 4 is a flowchart of initialization of an MPP in a wireless mesh network according to an embodiment of the disclosure.

As shown in FIG. 3, after the mesh node is operated by electricity:

Step 301: the mesh node checks the current connection state of itself, if there is a wired connection, the mesh node may be used as the MPP and enters the MPP initialization flow, and Step 302 is executed; if there is no wired connection, the mesh node enters the MP initialization flow, and Step 303 is executed;

Step 302: the MPP initialization flow is as follows, as shown in FIG. 4;

1) the IP address is obtained through a Dynamic Host Configuration Protocol (DHCP) or a static configuration;

2) the IP address of the AC is configured statically or obtained dynamically, connecting the AC by using a CAP-WAP interaction message includes: discovering the AC, establishing the DTLS protocol and join the AC, etc.;

3) the version is updated and the configuration parameter is downloaded from the AC, wherein when the update of version is in process, if restart is performed, Step 302 is returned to start;

4) after the configuration parameter took effect, the MPP enters a normal working. In the normal working state, the MPP transmits the beacon information periodically to notify the existence of itself, accepts the join and authentication of the new node, and forwards the message from other valid mesh nodes.

The configuration parameter issued by the AC to the MPP includes the following contents:

(1) Mesh enable: mesh enable;

(2) Mesh node role: including the MPP, the S-MPP, the MAP and the MP. The MPP is a mesh gateway point which connects a mesh network and a wired network; the S-MPP is a standby MPP; the MAP is a node having a mesh function and a user function of accessing a WLAN, the MAP is generally a dual network interface card node, mesh backhaul operates at a 5G frequency band, the WLAN coverage operates at a 2.4G frequency band; the MP is a node having a mesh function and forwards a wireless message;

(3) Mesh profile: the mesh profile includes information of basic attributes of one Mesh Basic Service Set (MBSS), which is broadcast in the beacon, and includes according to the definition of IEEE8020.11s:

(a) a Mesh ID-mesh network identification number, wherein different MBSS has different ID number, one MPP creates one MBSS and becomes the root node of the MBSS;

(b) a path selection protocol identifier;

(c) a path selection metric identifier;

(d) a congestion control mode identifier;

(e) a synchronization mode identifier;

(f) an authentication protocol identifier;

(g) manufacturer customized;

(4) Mesh capability—mesh capability information set, which is broadcast in the beacon;

(5) Mesh parameters—a handover threshold, a maximum hop count, a forwarding capability and so on;

(6) Mesh gateway supervision—a reporting period of mesh network supervision event or event parameter and so on;

(7) wireless parameters—working channel, rate and power information and so on;

(8) service parameter—QoS relevant information and so on;

(9) management domain identification number—each MBSS of each AC is a management domain, and has a unique identification number; the AC may judge whether a MBSS is within the scope of jurisdiction of itself according to the management domain identification number, and may limit the communication relationship among multiple management domains.

Figure 5:
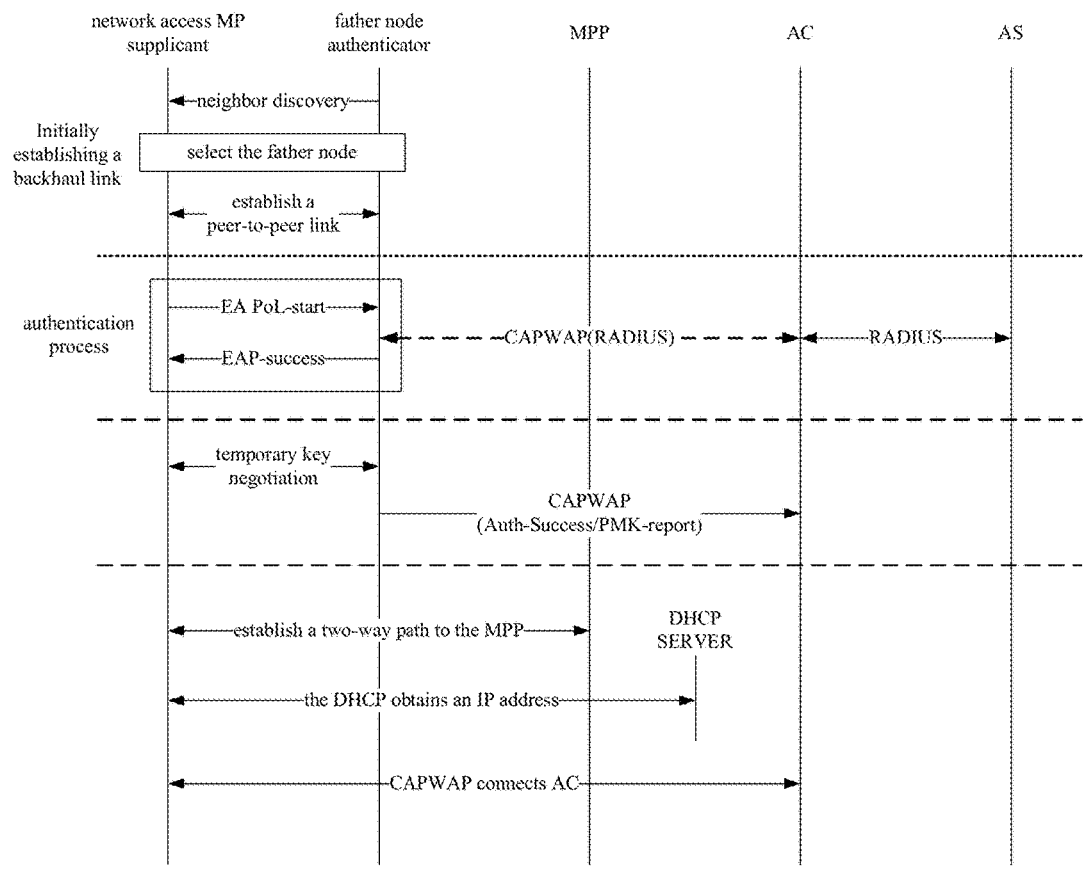
FIG. 5 is a flowchart of initialization of an MP in a wireless mesh network according to an embodiment of the disclosure.

Step 303: The MP is initialized as follows, as shown in FIG. 5.

a) The network access MP scans the channel within the backhaul frequency band, and monitors the mesh beacon frame. The capability information of the MBSS node is carried in the mesh beacon, and the network access MP selects the MBSS that matches the capability of itself to join.

b) The node that is authenticated successfully and establishes the secure path with the AC (the state is carried in the beacon) is selected as the father node candidate set, by using a tree path selected protocol (e.g., a prior Root Node Announcement (RANN) protocol of an HWMP in the IEEE802.11s, and the MPP is a root node. The network access MP needs to select the next hop node of the best path that arrives at the MPP from the father node candidate set as the father node (authenticator), establishes a flow according to the peer-to-peer link defined in the IEEE802.11s, and establishes the peer-to-peer link therewith, the following flow is implemented through the father node.

c) The 802.1X+EAP authentication is performed on the MP (serve as supplicant) accessing the network by using the father node as the authentication point, and the Remote Authentication Dial In User Service (RADIUS) message between the father node and the AS is transmitted to the AC through the CAPWAP message first. The AC forwards the RADIUS message to the AS. The RADIUS message replied by the AS is forwarded by the AC to the father node through the CAPWAP message.

d) The father node parsing the message replied to the AS includes extracting an EAP domain in the RADIUS message and obtaining an EAP message.

The father node transmits the parsed message to the network access MP, and judges whether the network access MP is authenticated successfully according to the parsed message. After the network access MP is authenticated successfully, the father node negotiates the temporary key with the network access MP based on the key information parsed from the RADIUS message transmitted by the AS, i.e., pairwise Primary Key (PMK). After that, the father node opens the controlled port of the MP. When the network access MP is authenticated unsuccessfully, the father node removes the peer-to-peer link that it establishes with the network access MP and refuses the peer-to-peer link to join. The temporary keys (i.e., a Pairwise Temporal Key (PTK) and a Group Temporal Key (GTK)) between the father node and the network access MP may be negotiated by using the AMPE and group key handshake process in the IEEE802.11s.

e) The father node transmits the successful authentication information and key information to the AC through the CAPWAP tunnel protected by the DTLS.

f) The father node establishes a two-way path relationship with the MPP, may establishes a communication path by using a Hybrid Wireless Mesh Protocol (HWMP) in the IEEE802.11s standard.

g) The network access MP may obtain the IP address in a way of DHCP or static configuration, a DHCP server may be installed on an authentication controller.

h) The IP address of the AC is configured statically or obtained dynamically, connecting the authentication controller by using the CAPWAP interaction message includes discovering the AC, establishing DTLS and joining the AC etc.; the version is updated and the configuration parameter is downloaded from the AC; after the updated version is restarted, the flow starts with Step 303.

i) After the configuration parameter is took effect, the Mp enters a normal working state. In the normal working state, the MP transmits the beacon information periodically to notify the existence of itself, accepts the join and authentication of the new node, and forwards the message from other valid mesh nodes.

The type of the configuration parameter issued by the AC for the MP is the same as that of the MPP, but the contents thereof are slightly different, specific performance of which in: Mesh profile: default or specific parameter value; if the parameter in the mesh profile of the MP is configured alone, it shows that the MP is limited to join the specified MBSS; if the default configuration is adopted, the MP may directly copy the mesh profile information in the selected MBSS.

Further, if the MBSS that the network access MP currently join is different from the mesh profile information issued by the AC, the flow needs to return to Step a) to look for the matched MBSS to join again.

Figure 6:
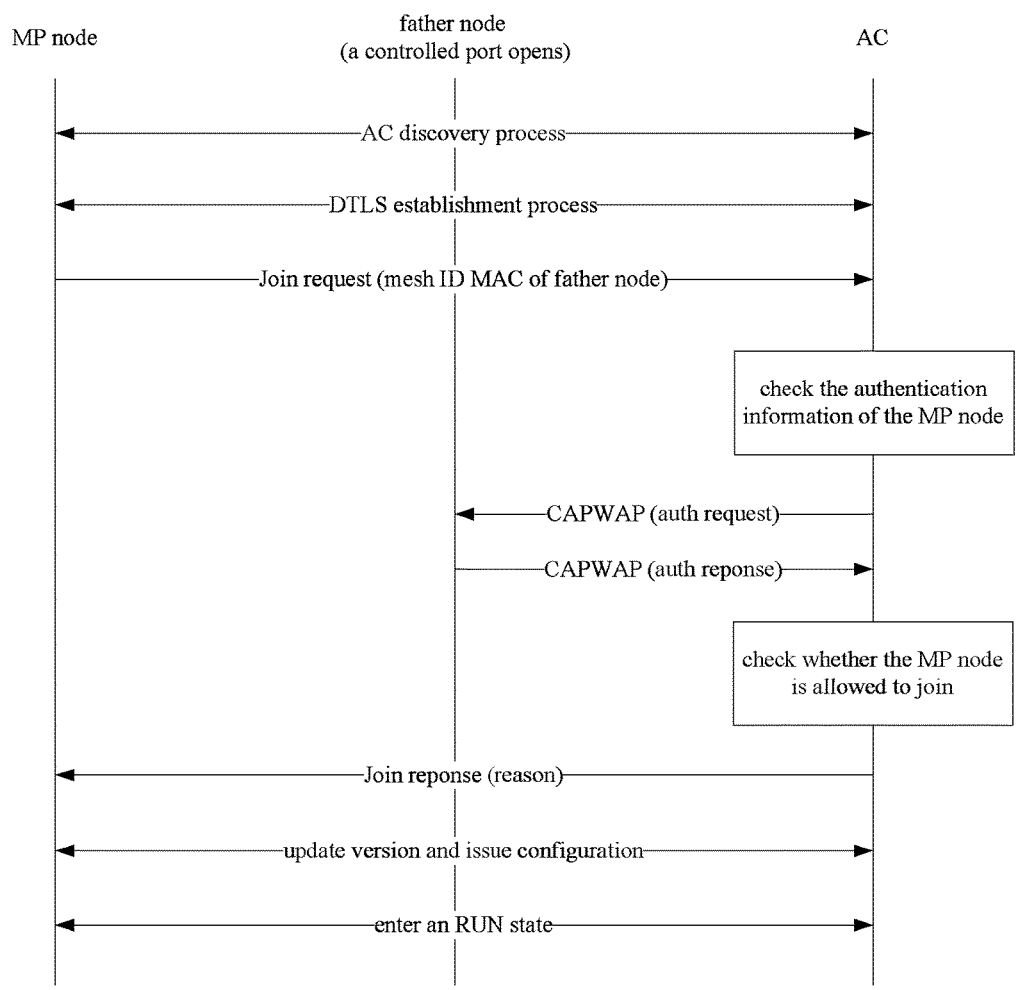
FIG. 6 is a flowchart of interaction that an MP is connected to an AC according to an embodiment of the disclosure.

Further, in the embodiment of the disclosure, according to the basic flow of the CAPWAP protocol, the flow that the MP is authenticated successfully and connects the AC is as shown in FIG. 6.

1) Discovering the AC: the MP sends a Discovery Request Message, the AC responds to a discovery request through a Discovery Response Message after receiving the Discovery Request Message.

2) The MP establishes the DTLS session with the AC.

3) The MP transmits a Join Request Message to the AC, wherein Mesh point Information is carried in a Vendor Specific Payload, including the following contents:

| Mesh enable | Node role | Mesh ID | The MAC address of the MPP | The MAC address of the father node | Inquiry text (optional) |
| --- | --- | --- | --- | --- | --- |

Optionally, the MP may encrypt the mesh point information with the PMK to generate the inquiry text, if the PMK obtained by the AC cannot decrypt the inquiry text correctly, the MP is not allowed to connect the AC. Other methods may also be used to generate an encryption key by the PMK.

4) The AC receives the Join Request Message in which the mesh point Information is carried. If the MBSS where the MP is located is authenticated in a way of IEEE802.1X+EAP, the authentication information of the MP is checked for the existence. After the MP is authenticated successfully, the father node reports the authentication information to the AC, before the MP connects the AC, the AC saved the authentication information of the MP for a certain period of time. If the MP does not connect the AC during this period, the authentication information will be deleted. If there is no authentication information of the MP, the AC requests the authentication information of the MP to the father node according to a CAPWAP control message Auth request message encrypted by the DTLS. The protocol format of the authentication request message is as follows:

| UDP Hdr | CAPWAP DTLS Hdr | DTLS Hdr | CAPWAP Hdr | Control Hdr | Auth request message | DTLS Tr |
| --- | --- | --- | --- | --- | --- | --- |

The Auth request message contains the following contents:

| The MAC address of the Supplicant | The management domain identifier of the Supplicant |
| --- | --- |

The MAC address of the supplicant is the MAC address of the MP, and the management domain identifier of the supplicant is issued by the AC to the MP, and empty herein.

5) The father node replies a authentication response message to the AC through the CAPWAP control message encrypted by the DTLS, including the following contents:

| The MAC address of the Supplicant | Reason | The PMK of the Supplicant |
| --- | --- | --- |

An authentication result of the MP is carried in the reason. The encryption primary key information of the MP is carried in the supplicant PMK, and is 0 in the case of unsuccessful authentication.

6) The AC judges whether the MP is allowed to access according to the authentication state of the MP and other capability information. If the MP is allowed to join, a Join Response Message in which a successful reason code is carried is replied, and the next step continues. If the MP is not allowed to join, a Join Response Message in which an failure reason code is carried is replied, and the MP is refused to join.

7) The version information is updated and the configuration parameter is obtained.

8) The MP enters an RUN state.

Further, if the MP is mobile, the connection relationship between the MP and the father node is unstable. If the AS needs to maintain the online condition of the MP, the AC may notify the AS of the MP online information after the MP connects the AC, and the online state of the MP is maintained by the AC.

Figure 7:
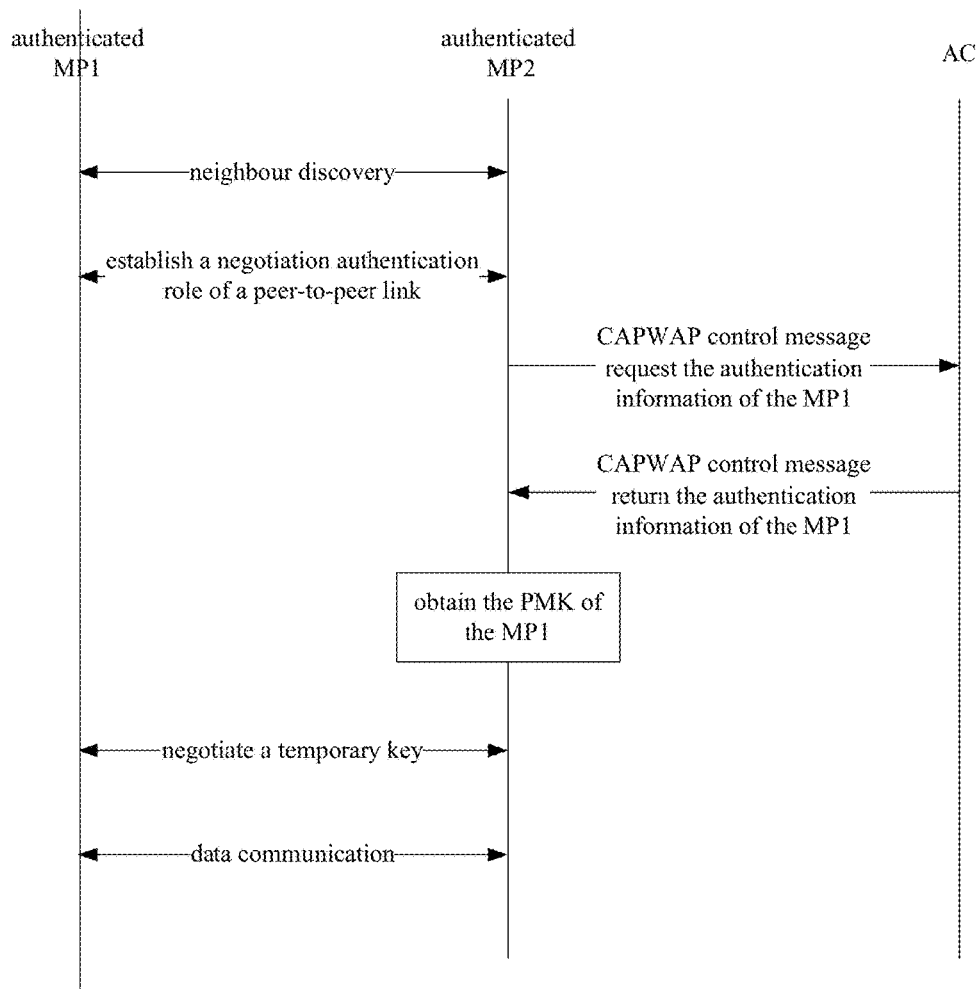
FIG. 7 is a flowchart of establishment of a secure link between two MPs that have been authenticated according to an embodiment of the disclosure.

Further, in the embodiment of the disclosure, the two nodes that have been authenticated may establish the secure peer-to-peer link after obtaining the authentication information about each other through the AC. The specific process is as shown in FIG. 7.

1) The MP1 and the MP2 discover that each other have been authenticated through the beacon.

2) The MP1 and the MP2 establish the peer-to-peer link, negotiate the authentication role in the process of establishing the peer-to-peer link to determine the supplicant. One simple implementation method is to compare the MAC addresses of the MP1 and the MP2, the MP having a small MAC address is used as the supplicant, and the other is used as the authenticated father node. The negotiation result in the figure is that the MP1 is the supplicant.

3) The MP2 requests the authentication information of the MP1 to the AC through the CAPWAP control message Auth request message encrypted by the DTLS, in which the management domain identifier of the supplicant needs to be carried.

4) After the AC receives the authentication request message, a) the AC judges whether the MP1 is the node that has been authenticated. If the MP1 is the node that has been authenticated, the next step b) is executed. If the MP1 is not the node that has been authenticated, a response message in which the failure reason is carried is replied;

b) whether the management domains of the MP1 and the MP2 are allowed to communicate with each other. If the management domains are allowed to communicate with each other, a successful response message is replied. If the management domains are not allowed to communicate with each other, a corresponding message in which the failure reason is carried is replied.

5) The AC replies the auth response message to the MP2 through the CAPWAP control message encrypted by the DTLS.

6) After the MP2 receives the authentication response message, if the MP1 is the valid site, the temporary key negotiation process is performed and the secure peer-to-peer link is established by using the obtained PMK of the MP1 between the MP2 and the MP1. If the MP1 is an invalid site, the peer-to-peer link that it establishes with the MP1 is removed.

The fast roaming process defined by the IEEE802.11r is also applicable to the embodiment.

Figure 8:
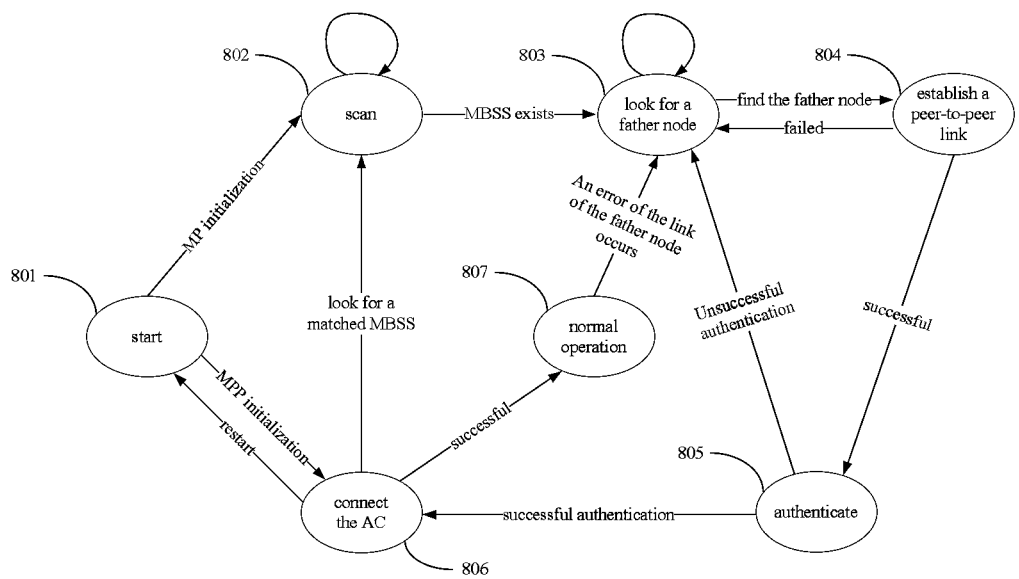
FIG. 8 is a diagram of initialization state transition of a mesh node according to an embodiment of the disclosure.

In order to explain the interaction relationship between the above nodes as well as the AC and the AS more clearly, the interaction relationship will be further described in detail through a state diagram as shown in FIG. 8:

FIG. 8 is a state diagram of a Mesh node (an MPP and an MP) within a system of an embodiment of the disclosure, including:

Step 801 is executed, in which the type of initialization is judged according to whether there is a wired connection, if there is a wired connection, the MPP is initialized, and Step 806 is executed, and if there is no wired connection, the MP is initialized, and Step 802 is executed;

Step 802 is executed, in which the mesh node scans the working channel within the backhaul frequency band, and collects the mesh beacon, if there is an MBSS matched with the capability of itself, Step 803 is executed, and if there is no MBSS matched with the capability of itself, scanning continues;

Step 803 is executed, in which one authenticated father node is selected, for example selected by using a routing protocol. If the authenticated father node is found, Step 804 is executed. In order to prevent routing attack, if a tree routing protocol is not used, it is suggested that before authentication, the father node may be selected according to other conditions, and after authentication, the path selection process starts;

Step 804 is executed, in which a peer-to-peer link is established with the selected father node. If the establishment is successful, Step 805 is executed, and if the establishment is failure, Step 803 is executed to look for the father node again;

Step 805 is executed, in which the mesh node starts the authentication flow. If the authentication is successful, Step 806 is executed, and if the authentication is failure, Step 803 is executed to look for the father node again;

Step 806 is executed, in which the AC is connected through the CAPWAP. If the mesh node restarted because the version is updated, Step 801 is executed; if the MP discovers that the MBSS information issued by the AC does not match the MBSS where it is located, Step 802 is executed to look for an appropriate MBSS to join; if the issued configuration information is initialized successfully, Step 807 is executed;

Step 807 is executed, in which the mesh node which enters a working mode transmits the beacon, forwards data and so on.

To sum up, in the embodiment of the disclosure, the MPP may directly connect the AC through a wire. The MP, before connecting the AC, needs identity authentication and obtains the key for wireless link encryption. The MP becomes the valid mesh node after connecting the AC successful, and may be used as the authenticator to authenticate the node newly accessing the network.

A secure communication connection exists between the AC and the valid mesh node, for example by using the CAPWAP tunnel protected by the DTLS.

The temporary keys (the PTK and the GTK) are generated and updated between the two MPs that communicate with each other directly, and the data is encrypted or decrypted between single-hop nodes.

The authentication information (authentication state and PMK and so on) of each node is centrally collected and managed by the AC and used to inquire the authentication information of the specified node.

The wireless mesh networks communicate internally through the mesh protocol, for example the IEEE802.11s. The MPP/MP and the AC communicate with each other through the CAPWAP protocol. The mesh node and the AS communicate with each other through the RADIUS protocol.

The system configuration information of the MPP and MPs in the wireless mesh network may be issued in a way of AC pre-configuration. However, when the MP is initially accessed before being authenticated, the backhaul path is established by using the default configuration information, and the configuration information is issued by the AC. If the accessed mesh network information does not match the configuration information issued by the AC, it is necessary to look for the matched mesh network to join according to the configuration information issued by the AC.

The MPs managed by the same AC may inquire the authentication state and the key of each other to the AC. The two MPs that have been authenticated successfully may directly establish the secure peer-to-peer link by the information provided by the AC.

System Embodiment

Figure 9:
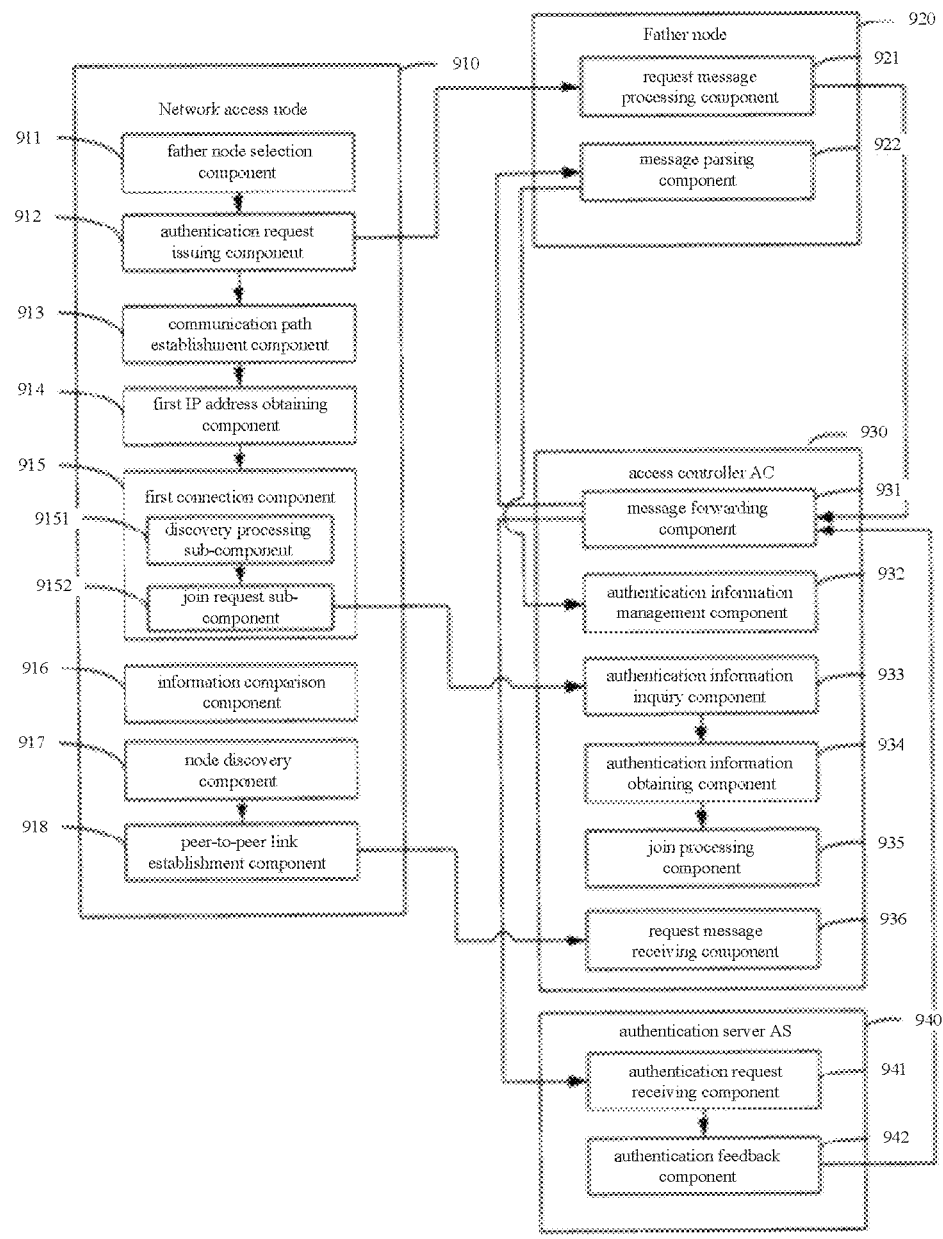
FIG. 9 is a structural diagram of an authentication system for a wireless mesh network according to an embodiment of the disclosure.

As shown in FIG. 9, which shows an authentication system for a wireless mesh network according to the embodiment of the disclosure, including: a network access node 910, a father node 920, an AC 930 and an AS 940, wherein after being authenticated successfully and finally in an operation state, the network access node 910 may also be used as the father node adjacent to the network access node. So the network access node includes all of the following components of the father node. In order to explain the interaction relationship of each other clearly, the network access node and the father node are explained respectively.

The network access node 910, when the node is an MP, includes:

a father node selection component 911, is configured to select one authenticated node from neighbor nodes as a father node, and establish a peer-to-peer link with the father node, wherein a uniquely identified secure path exists between the selected father node and the AC to identify the validity of the father node; and an authentication request issuing component 912, is configured to initiate an authentication request message to the father node.

The father node selection component 911 is configured to scan a channel within a backhaul frequency band, monitor a beacon; select an MBSS matched with a capability of the MP to join according to MBSS node capability information carried in the beacon; and select one or more node that have been authenticated and have established a secure path with the AC as a father node candidate set, according to node state information carried in the beacon, and by using an MPP as a root node, select a next hop node of a path which arrives at the MPP at a lowest cost from the father node candidate set according to a set path selection policy.

The father node 920 includes:

a request message processing component 921, is configured to receive the authentication request message initiated by the network access node, transmit the authentication request message to the AC through a secure path between the father node and the AC, which then forwards the authentication request message to an AS; and a message parsing component 922, is configured to receive and parse an authentication response message fed back by the AS through the AC, and transmit authentication state and key information carried in the authentication response message to the AC.

The AC 930 includes:

a message forwarding component 931, is configured to receive the authentication request message from the father node 920 through the secure path, and forward the message to the AS 940, receive the authentication response message fed back by the AS 940 and transmit the message to the father node 920 through the secure path; and an authentication information management component 932, is configured to receive the authentication state and key information of the network access node reported by the father node, and maintain the authentication information of a valid node that has been authenticated.

The AS 940 includes:

an authentication request receiving component 941, is configured to receive the authentication request message from the AC; and an authentication feedback component 942, is configured to, after authenticating the network access node, feed back an authentication response message to the AC.

Based on the above principle framework, the specific implementation of the system of the embodiment of the disclosure will be further explained below.

In the system of the embodiment, the network access node 910 further includes:

a communication path establishment component 913, is configured to establish a two-way communication path with the MPP;

a first IP address obtaining component 914, is configured to obtain an IP address of the MP and IP address information of the AC; and a first connection component 915, is configured to connect the AC, and obtain update version information and configuration parameter information from the AC, and establish a uniquely identified secure path where a unique identifier exists with the AC.

Further, the first connection component 915 includes:

a discovery processing sub-component 9151, is configured to discover the AC, and establish a DTLS protocol session with the AC; and a join request sub-component 9152, is configured to transmit a join request message in which mesh node information is carried to the AC.

Further, the AC 930 includes:

an authentication information inquiry component 933, is configured to check whether authentication information of the network access node exists according to the join request message of the join processing sub-component 9152, if the authentication information does not exist, trigger an authentication information obtaining component, otherwise trigger a join processing component;

the authentication information obtaining component 934, is configured to request the authentication information of the network access node to the father node of the network access node, and after receiving the authentication information from the father node, trigger the join processing component; and the join processing component 935, is configured to judge whether the network access node is allowed to access according to the authentication state and capability information of the network access node in the authentication information, if the network access node is not allowed, return a failure response message; otherwise, allow the network access node to access.

Example Solutions

The join request sub-component 9152 is also configured to, when the MP transmits the join request message to the AC, encrypt the MP information by using the key information obtained from an authentication process to produce an inquiry text; and the join processing component 935 is also configured to decrypt the inquiry text according to the key information in the authentication information, if the inquiry text is decrypted correctly, judge whether the MP is allowed to access according to the authentication state and the MP capability information in the authentication information; if the inquiry text is decrypted incorrectly, return the failure response message.

Further, in the system of the embodiment, the network access node 910 further includes:

an information comparison component 916, is configured to, after obtaining the configuration information, judge whether information of a currently accessed mesh network matches the obtained configuration information, if the information of the mesh network does not match the obtained configuration information, look for a matched mesh network to access according to the obtained configuration information, and re-select a father node and re-authenticate the father node.

Further, in the system of the embodiment, the network access node 910 further includes:

a node discovery component 917, is configured to, after the network access node completes authentication, discover that both are a second network access node that has been authenticated through beacon information, establish the peer-to-peer link with the second network access node, and negotiate an authentication role to determine a supplicant and an authenticator; and a peer-to-peer link establishment component 918, is configured to, when the network access node is the authenticator, request the authentication information of the supplicant to the AC through the secure path, and after receiving a response message from the AC, judge whether the supplicant is a valid site, if the supplicant is the valid site, perform temporary key negotiation with the supplicant according to key information carried in the response message to establish a secure peer-to-peer link; otherwise, remove the peer-to-peer link established with the supplicant.

Further, the AC 930 also includes:

a request message receiving component 936, is configured to, when receiving the request message transmitted by the peer-to-peer link establishment component through the secure path, judge whether the supplicant is the node that has been authenticated, if the supplicant is not the node that has been authenticated, reply the failure response message in which a reason for failure is carried; if the supplicant is the node that has been authenticated, judge whether management domains of the authenticator and the supplicant are allowed to communicate with each other, if the management domains are allowed to communicate with each other, reply a successful response message in which the key information is carried; if the management domains are not allowed to communicate with each other, reply the failure response message in which the reason for failure is carried.

Figure 10:
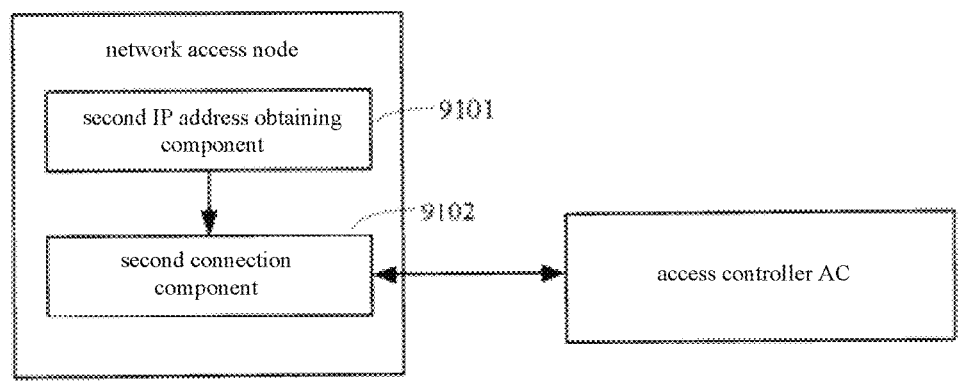
FIG. 10 is a structural diagram of another authentication system for a wireless mesh network according to an embodiment of the disclosure.

Further, in the system of the embodiment, the network access point 910, when the node is an MPP, as shown in FIG. 10, includes:

a second IP address obtaining component 9101, is configured to obtain the IP address information of the MPP and the IP address information of the AC; and a second connection component 9102, is configured to connect the AC, and obtain the update version information and configuration parameter information from the AC, and establish a uniquely identified secure path where the unique identifier exists with the AC.

Figure 11:
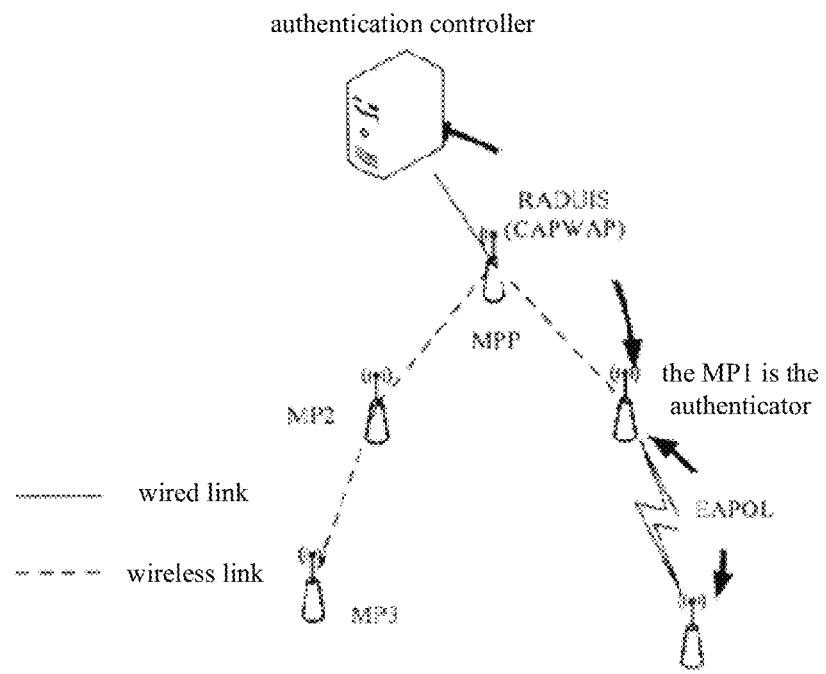
FIG. 11 is a diagram of component composition of an authentication manager according to an embodiment of the disclosure.

As shown in FIG. 11, the embodiment of the disclosure further provides an authentication system for a wireless mesh network, including a network access node, a father node and an authentication manager, wherein the authentication manager integrates the functions of the AC and the AS so that the authentication manager has an access control function and an authentication management function.

Figure 12:
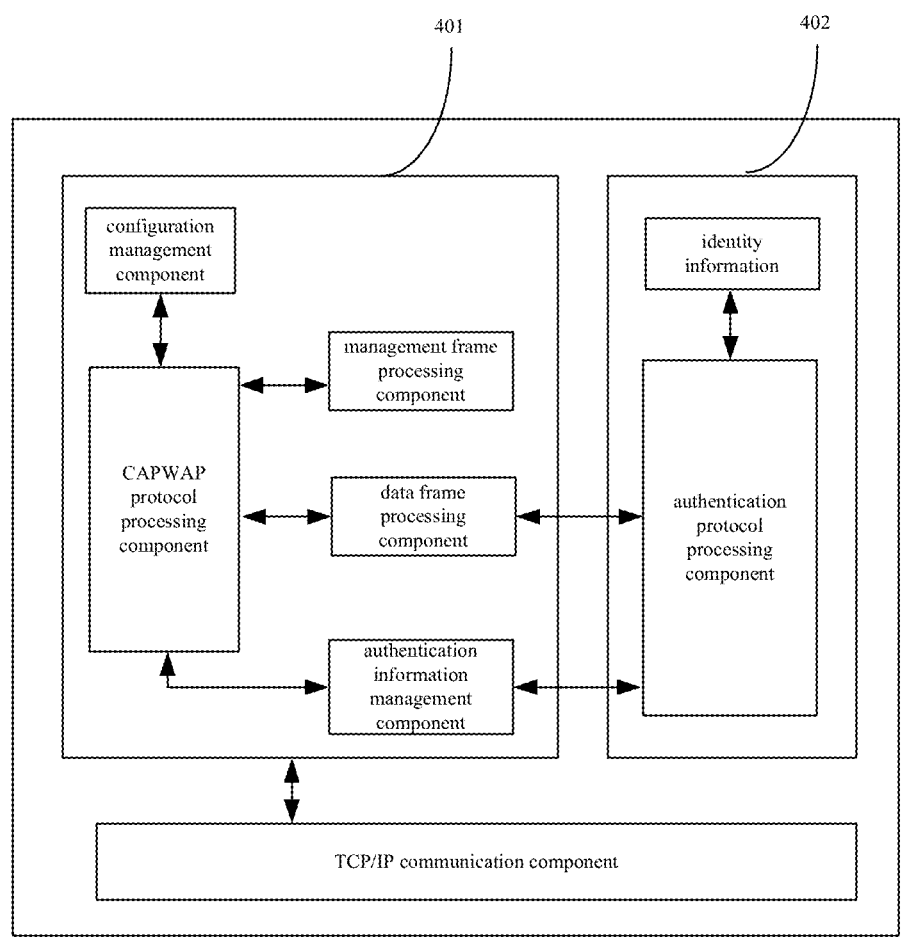
FIG. 12 is a flowchart in which a system having an authentication manager implements MP initialization according to an embodiment of the disclosure.

As shown in FIG. 12, the authentication manager includes a management component 401 and an authentication component 402, wherein the management component 401 has the management function of the AC, one secure link is established between every mesh node that passes an authentication and the authentication manager which performs issuing configuration, management or other operations on the mesh node through the secure link, for example a CAPWAP protocol is used to establish a CAPWAP tunnel; the authentication component 402 saves authentication password information of the mesh node and so on, the mesh node newly accessing the network selects the mesh node of the authentication component that is authenticated successfully as the authenticator, and initiates an authentication flow to the authentication manager, the authentication protocol processing component in the authentication manager may verify the validity of the identity of the mesh node, the 3A protocol message between the authenticator and the authentication manager is packaged and delivered through the established secure link, the 3A protocol is for example an RADIUS protocol.

When the AC and the AS are integrated to form the authentication manager, the technical solutions by which the disclosure is implemented are substantially the same as the above technical solutions, and the difference is that, since the AC and the AS are integrated together, unnecessary information interaction therebetween is deleted, and the AC function component may directly save the authentication information of the node that is authenticated by the AS, and is not required for reporting by the father node. The implementation process is as follows:

As shown in FIG. 13, the MP is initialized as follows:

1) The network access MP scans the channel within the backhaul frequency band, and monitors the mesh beacon frame. The capability information of the MBSS node is carried in the mesh beacon, and the network access MP selects the MBSS that matches the capability of itself to join.

2) The node that is authenticated successfully and establishes the secure path with the AC (the state is carried in the beacon) is selected as the father node candidate set, by using a tree path selected protocol (e.g., a prior RANK protocol of an HWMP in the IEEE802.11s), and the MPP is a root node. The network access MP needs to select the next hop node of the best path that arrives at the MPP from the candidate set as the father node, establishes a flow according to the peer-to-peer link defined in the IEEE802.11s, and establishes the peer-to-peer link therewith, the following flow is implemented through the father node.

3) The 802.1X+EAP authentication is performed on the network access MP by using the father node as the authentication point, and the RADIUS message transmitted by the father node to the authentication server is transmitted to the management component 401 through the CAPWAP tunnel. The management component 401 decapsulates a CAPWAP message after receiving the CAPWAP message, extracts the authentication information of the network access MP to the authentication component 402, transmits the RADIUS response message returned by the authentication component 402 to the father node through the CAPWAP tunnel. If the network access MP is authenticated successfully, the management component 401 may record the authentication information (the PMK etc.) of the MP directly.

4) After successful authentication, the father node and the network access MP perform temporary key negotiation. After that, the father node will open a controlled port of the MP. If the network access MP is authenticated unsuccessfully, the father node removes the peer-to-peer link that it establishes with the network access MP and refuses the peer-to-peer link to join. The temporary keys (the PTK and the GTK) between the father node and the network access MP may be negotiated by using the AMPE and group key handshake in the IEEE8020.11s.

5) The MPP establishes a two-way path relationship with the father node, for example establishing the two-way path by using the HWMP protocol in the IEEE802.11s.

6) The network access MP may obtain the IP address in a way of DHCP or static configuration, a DHCP server may be installed on an authentication controller.

7) The IP address of the authentication controller is configured statically or obtained dynamically, connecting the authentication controller by using the CAPWAP interaction message includes a discovery process, an establishing DTLS and join process etc., and the version is updated and the configuration parameter is downloaded from the authentication controller.

8) After the configuration parameter is took effect, the MP enters a normal working state. In the normal working state, the MP transmits the beacon information periodically to notify the existence of itself, accepts the join and authentication of the new node, and forwards the message from other valid mesh nodes.

The two nodes that have been authenticated request the authentication information about each other through the component 401 of the CAPWAP tunnel message authentication manager, which simplifies the authentication flow.

To sum up, when the node is authenticated by the method and the system provided according to the embodiments of the disclosure, the message in the whole authentication flow needs to be forwarded through the AC, the AC may check the validity of the identity of the authenticator, and the MP may share the authentication information through the AC to simplify the authentication flow, thereby improving the authentication efficiency. In addition, the AC may manage all the mesh nodes in the wireless mesh network by using the method and the system of the disclosure, thereby achieving the effect of centralized management and control.

Obviously, those skilled in the art may change and modify the disclosure without departing from the spirit and scope of the disclosure. In this way, if these changes and modifications of the disclosure fall within the scope of the claims of the disclosure and equivalent technology thereof, the disclosure is also intended to encompass those changes and modifications.

What is claimed is:

1. An authentication method for a wireless mesh network, comprising:
   selecting, by a Mesh Point (MP), one authenticated node from neighbor nodes as a father node, when a new node accesses a network and the node is the MP, and establishing a peer-to-peer link with the father node, wherein a uniquely identified secure path exists between the father node and an Access Controller (AC) to identify validity of the father node;
   receiving, by the father node, an authentication request message initiated by the MP, transmitting the authentication request message to the AC through the secure path between the father node and the AC which then forwards the authentication request message to an Authentication Server (AS), and receiving an authentication response message fed back by the AS; and
   transmitting, by the father node, an authentication state and key information carried in the authentication response message to the AC which then maintains authentication information of a valid node that has been authenticated, wherein the AC checks the validity of an identity of an authenticator, and the MP node shares an authentication message through the AC;

wherein the MP selecting one authenticated node from the neighbor nodes as the father node comprises: scanning, by the MP, a channel within a backhaul frequency band, and monitoring a beacon; selecting, by the MP, an Mesh Basic Service Set (MBSS) matched with a capability of the MP to join according to MBSS node capability information carried in the beacon; and selecting, by the MP, one or more nodes that have been authenticated and have established a secure path with the AC as a father node candidate set according to node state information carried in the beacon, and by using a Mesh Portal Point (MPP) as a root node, selecting a next hop node of a path which arrives at the MPP at a lowest cost from the father node candidate set according to a set path selection policy;

wherein after the father node receives the authentication response message, the method further includes: parsing, by the father node, the authentication response message, transmitting, by the father node, the parsed message to the MP, and judging, by the father node, whether the MP is authenticated successfully according to the parsed message, when the MP is authenticated successfully, extracting, by the father node, the key information carried in the parsed message, negotiating, by the father node, a temporary key with the MP and opens a controlled port of the MP.

2. The method according to claim 1, wherein the method further comprises:

establishing, by the MP, a two-way communication path with the MPP;

obtaining, by the MP, an IP address of the MP and IP address information of the AC; and connecting, by the MP, to the AC, obtaining update version information and configuration parameter information from the AC, and establishing a uniquely identified secure path with the AC.

3. The method according to claim 2, wherein the MP connecting to the AC comprises:

discovering, by the MP, the AC, and establishing a Datagram Transport Layer Security (DTLS) protocol session with the AC;

transmitting, via the MP, a join request message in which mesh node information is carried to the AC;

determining, by the AC, whether authentication information of the MP exists;

requesting, by the AC, authentication information of the MP to the father node of the MP when the authentication information does not exist, and receiving the authentication information of the MP from the father node; and determining, by the AC, whether the MP is allowed to access according to the authentication state and MP capability information in the authentication information, returning a failure response message when the MP is not allowed to access; and allowing the MP to access when the MP is allowed to access.

4. The method according to claim 3, wherein transmitting, via the MP, a join request message in which mesh node information is carried to the AC further comprises: encrypting the MP information by using the key information obtained from an authentication process to produce an inquiry text, when the MP transmitting the join request message to the AC; and determining, by the AC, whether the MP is allowed to access according to the authentication state and MP capability information in the authentication information further comprises: decrypting, by the AC, the inquiry text according to the key information in the authentication information, determining whether the MP is allowed to access according to the authentication state and the MP capability information in the authentication information, when the inquiry text is decrypted correctly; and returning the failure response message, when the inquiry text is decrypted incorrectly.

5. The method according to claim 2, wherein the method further comprises:

determining, by the MP, whether information of a currently accessed mesh network matches obtained configuration information, when the MP obtaining the configuration information, looking for a matched mesh network to access according to the obtained configuration information, when the information of the mesh network does not match the obtained configuration information, and re-selecting a father node and re-authenticating the father node.

6. The method according to claim 1, wherein the method further comprises:

establishing, by a mesh point MP1 and a mesh point MP 2, a peer-to-peer link, when the MP1 and the MP2 discover that both have been authenticated through beacon information in the wireless mesh network, and negotiating an authentication role to determine a supplicant and an authenticator; and requesting, by the authenticator, authentication information of the supplicant to the AC through the secure path, determining whether the supplicant is a valid site, when receiving a response message from the AC, performing temporary key negotiation with the supplicant according to key information carried in the response message to establish a secure peer-to-peer link, when the supplicant is the valid site; and removing the peer-to-peer link established with the supplicant, when the supplicant is the valid site.

7. The method according to claim 6, wherein the method further comprises:

when receiving the request message transmitted from the authenticator through the secure path, determining, by the AC, whether the supplicant is the node that has been authenticated, when receiving the request message transmitted from the authenticator through the secure path, replying the failure response message in which a reason for failure is carried, when the supplicant is not the node that has been authenticated; determining whether management domains of the authenticator and the supplicant are allowed to communicate with each other, when the supplicant is the node that has been authenticated, replying a successful response message in which the key information is carried, when the management domains are allowed to communicate with each other; and replying the failure response message in which the reason for failure is carried, when the management domains are not allowed to communicate with each other.

8. The method according to claim 1, wherein the method further comprises:

obtaining, by an MPP, the IP addresses of the MPP and the AC, when a new node accesses a network and the node is the MPP; and connecting, by the MPP, to the AC, obtaining update version information and configuration parameter information from the AC, and establishing a uniquely identified secure path with the AC.

9. An authentication system for a wireless mesh network, comprising: a network access node, a father node, an Access Controller (AC) and an Authentication Server (AS), wherein
the network access node, when the network access node is a Mesh Point (MP), comprises a first memory storing a first set of program units, and a first hardware processor configured to the first set of program units stored on the first memory, the first set of program units comprising:
a father node selection component, configured to select one authenticated node from neighbor nodes as a father node, and establish a peer-to-peer link with the father node, wherein a uniquely identified secure path exists between the selected father node and the AC to identify validity of the father node; and
an authentication request issuing component, configured to initiate an authentication request message to the father node;
the father node comprises a second memory storing a second set of program units, and a second hardware processor configured to the second set of program units stored on the second memory, the second set of program units comprising:
a request message processing component, configured to receive the authentication request message initiated by the network access node, transmit the authentication request message to the AC through a secure path between the father node and the AC, which then forwards, the authentication request message to an AS; and
a message parsing component, configured to receive and parse an authentication response message fed back by the AS through the AC, and transmit authentication state and key information carried in the authentication response message to the AC;
the AC comprises a third memory storing a third set of program units, and a third hardware processor configured to the third set of program units stored on the third memory, the third set of program units comprising:
a message forwarding component, configured to receive the authentication request message from the father node through the secure path, which then forwards the authentication request message to the AS, and receive the authentication response message fed back by the AS and transmit the message to the father node through the secure path; and
an authentication information management component, configured to receive the authentication state and key information of the network access node reported by the father node, which then maintains the authentication information of a valid node that has been authenticated, wherein the AC checks the validity of an identity of an authenticator, and the MP node shares an authentication message through the AC; and
the AS comprises a fourth memory storing a fourth set of program units, and a fourth hardware processor configured to the fourth set of program units stored on the fourth memory, the fourth set of program units comprising:
an authentication request receiving component, configured to receive the authentication request message transmitted by the AC; and
an authentication feedback component, configured to, after authenticating the network access node, feedback an authentication response message to the AC;
wherein the father node selection component is configured to scan a channel within a backhaul frequency band, monitor a beacon; select an Mesh Basic Service Set (MBSS) matched with a capability of the MP to join according to MBSS node capability information carried in the beacon; select one or more nodes that have been authenticated and have established a secure path with the AC as a father node candidate set according to node state information carried in the beacon, and by using a Mesh Portal Point (MPP) as a root node, and select a next hop node of a path which arrives at the MPP at a lowest cost from the father node candidate set according to a set path selection policy;
wherein the father node is further configured to parse the authentication response message, transmits the parsed message to the MP, and judge whether the MP is authenticated successfully according to the parsed message, when the MP is authenticated successfully, extract the key information carried in the parsed message, negotiate, a temporary key with the MP and opens a controlled port of the MP.

10. The system according to claim 9, wherein,
the first hardware processor in a Mesh Basic Service Set (MBSS) the network access node is further configured to execute following program units:
a communication path establishment component, configured to establish a two-way communication path with the MPP;
a first IP address obtaining component, configured to obtain an IP address of the MP and IP address information of the AC; and
a first connection component, configured to connect the AC, and obtain update version information and configuration parameter information from the AC, and establish a uniquely identified secure path where a unique identifier exists with the AC;
the first hardware processor in the network access node is further configured to execute following program units:
a node discovery component, configured to, after the network access node completes authentication, discover that both are a second network access node that has been authenticated through beacon information, establish the peer-to-peer link with the second network access node, and negotiate an authentication role to determine a supplicant and an authenticator; and
a peer-to-peer link establishment component, configured to, when the network access node is the authenticator, request the authentication information of the supplicant to the AC through the secure path, and after receiving a response message from the AC, judge whether the supplicant is a valid site, if the supplicant is the valid site, perform temporary key negotiation with the supplicant according to the key information carried in the response message to establish a secure peer-to-peer link; otherwise, remove the peer-to-peer link established with the supplicant;
the first hardware processor in the network access node, when the type of the network access node is an MPP type, is further configured to execute following program units:

a second IP address obtaining component, configured to obtain the IP address information of the MPP itself and the IP address information of the AC; and a connection component, configured to connect the AC, and obtain the update version information and configuration parameter information from the AC, and establish the secure path where the unique identifier exists with the AC; and the AC and the AS are integrated to form an authentication manager, wherein after authentication manager authenticating the network access node, the authentication information is saved and maintained locally, wherein the authentication information contains the authentication state and the key information directly when the authentication is successful.

11. The system according to claim 10, wherein, the first hardware processor in the first connection component is further configured to execute following program units:

a discovery processing sub-component, configured to discover the AC, and establish a Datagram Transport Layer Security (DTLS) protocol session with the AC;

a join request sub-component, configured to transmit a join request message in which mesh node information is carried to the AC;

the third hardware processor in the AC is further configured to execute following program units:

an authentication information inquiry component, configured to check whether authentication information of the network access node exists according to the join request message of the join processing sub-component, trigger an authentication information obtaining component, when the authentication information does not exist; and trigger a join processing component, when the authentication information exists;

the authentication information obtaining component, configured to request the authentication information of the network access node to the father node of the network access node, and after receiving the authentication information from the father node, trigger the join processing component; and the join processing component, configured to determine whether the network access node is allowed to access according to the authentication state and capability information of the network access node in the authentication information, return a failure response message, when the network access node is not allowed; and allow the network access node to join, when the network access node is allowed.

12. The system according to claim 11, wherein, the join request sub-component is further configured to encrypt the MP information by using the key information obtained from an authentication process to produce an inquiry text, when the MP transmitting the join request message to the AC; and the join processing component is further configured to decrypt the inquiry text according to the key information in the authentication information, determine whether the MP is allowed to access according to the authentication state and the MP capability information in the authentication information, when the inquiry text is decrypted correctly; and return the failure response message, when the inquiry text is decrypted incorrectly.

13. The system according to claim 10, wherein the first hardware processor in the network access node is further configured to execute a following program unit:

an information comparison component, configured to determine whether the information of a currently accessed mesh network matches the obtained configuration information, after obtaining the configuration information, look for the matched mesh network to access according to the obtained configuration information, when the information of the mesh network does not match the obtained configuration information, and re-select a father node and re-authenticate the father node.

14. The method according to claim 3 further comprising:

determining whether information of a currently accessed mesh network matches obtained configuration information after the MP obtaining the configuration information, looking for a matched mesh network to access according to the obtained configuration information, when the information of the mesh network does not match the obtained configuration information, and re-selecting a father node and re-authenticating the father node.

15. The system according to claim 12, wherein the first hardware processor in the network access node is further configured to execute a following program unit:

an information comparison component, configured to judge whether the information of a currently accessed mesh network matches the obtained configuration information, after obtaining the configuration information, look for the matched mesh network to access according to the obtained configuration information, when the information of the mesh network does not match the obtained configuration information, and re-select a father node and re-authenticate the father node.

16. The method according to claim 4 further comprising:

determining whether information of a currently accessed mesh network matches obtained configuration information, after the MP obtaining the configuration information, looking for a matched mesh network to access according to the obtained configuration information, when the information of the mesh network does not match the obtained configuration information, and re-selecting a father node and re-authenticating the father node.

17. The system according to claim 11, wherein the first hardware processor in the network access node is further configured to execute a following program unit:

an information comparison component, configured to, after obtaining the configuration information, determine whether the information of a currently accessed mesh network matches the obtained configuration information, if the information of the mesh network does not match the obtained configuration information, look for the matched mesh network to access according to the obtained configuration information, and re-select a father node and re-authenticate the father node.

18. The system according to claim 12, wherein the first hardware processor in the network access node is further configured to execute a following program unit:

an information comparison component, configured to, after obtaining the configuration information, determine whether the information of a currently accessed mesh network matches the obtained configuration information, if the information of the mesh network does not match the obtained configuration information, look for the matched mesh network to access according to the obtained configuration information, and re-select a father node and re-authenticate the father node.

* * * * *